US011066266B2

United States Patent
Harada

(10) Patent No.: US 11,066,266 B2
(45) Date of Patent: Jul. 20, 2021

(54) CUTTING DEVICE, PRINTER AND METHOD FOR DETECTING OPERATION ERROR

(71) Applicant: TOSHIBA TEC KABUSHIKI KAISHA, Tokyo (JP)

(72) Inventor: Noriaki Harada, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 272 days.

(21) Appl. No.: 16/419,295

(22) Filed: May 22, 2019

(65) Prior Publication Data
US 2019/0359443 A1   Nov. 28, 2019

(30) Foreign Application Priority Data

May 25, 2018   (JP) .............................. JP2018-100430

(51) Int. Cl.
*H04N 1/08* (2006.01)
*B65H 35/00* (2006.01)
*H04N 1/00* (2006.01)

(52) U.S. Cl.
CPC ....... *B65H 35/0086* (2013.01); *H04N 1/0066* (2013.01); *H04N 1/00676* (2013.01)

(58) Field of Classification Search
CPC ............. B65H 35/0086; H04N 1/0066; H04N 1/00676
See application file for complete search history.

(56) References Cited

U.S. PATENT DOCUMENTS

2011/0280644 A1* 11/2011 Toyoshima ............ B26D 1/205
                                                          400/621
2018/0304651 A1* 10/2018 Gojo ....................... B41J 29/46

FOREIGN PATENT DOCUMENTS

JP        2001-001589 A       1/2001

* cited by examiner

Primary Examiner — Ibrahim Siddo
(74) Attorney, Agent, or Firm — Foley & Lardner LLP

(57) ABSTRACT

A cutting device includes a cutter, a drive mechanism, a counting module, a determination module, and a detection module. The cutter has a movable piece that is configured to cut a medium. The drive mechanism is configured to change a position or posture of the movable piece. The counting module is configured to count a number of times the position or posture of the movable piece changes. The determination module is configured to variably determine a reference speed according to the number of times. The detection module is configured to detect an operation error of the cutter according to a comparison result between a speed at which the position or posture of the movable piece is changed and the reference speed.

14 Claims, 3 Drawing Sheets

CUTTING DEVICE, PRINTER AND METHOD FOR DETECTING OPERATION ERROR

CROSS-REFERENCE TO RELATED APPLICATION

This application is based upon and claims the benefit of priority from Japanese Patent Application No. 2018-100430, filed on May 25, 2018, the entire contents of which are incorporated herein by reference.

FIELD

Embodiments described herein relate generally to a cutting device, a printer, and a method for detecting an operation error.

BACKGROUND

In some applications, a cutting device is provided in a printer. The cutting device cuts a medium such a print medium. The cutting device, or an apparatus, such as a printer, that is provided with the cutting device, may perform an error process when cutting of the print medium is not completed normally. The error process may include issuing an alarm.

In a cutting device that cuts a medium by changing a posture or a position of a movable piece on which a blade is formed, if a speed of change in the movable piece is detected and the detected speed is slower than a predetermined speed, an abnormality is detected since the cutting is not performed normally.

However, the speed of change varies depending on various conditions. For example, as the blade gradually deteriorates over time, the load of the medium on the movable piece gradually increases, and the speed of change tends to gradually increase. For example, as foreign matters adhering to the movable piece are accumulated, the load of the medium on the movable piece gradually increases, and the speed of change tends to gradually increase.

For this reason, it is difficult to properly detect an abnormality based on the speed of change in the posture or the position of the movable piece. Improving the ability to properly detect such an abnormality would be advantageous.

DETAILED DESCRIPTION

In accordance with one embodiment, a cutting device includes: a cutter configured to cut a medium by changing a movable piece; a drive mechanism configured to change a position or posture of the movable piece; a counting module configured to count the number of times the movable piece changes; a determination module configured to variably determine a reference speed according to the number of times counted by the counting module; and a detection module configured to detect an operation error of the cutter according to a comparison result between a speed at which a position or posture of the movable piece is changed by the drive mechanism and the reference speed determined by the determination module. As utilized herein, changing the position or posture of the movable piece may include linearly translating (e.g., across the print medium, etc.) and/or rotating (e.g., on the print medium, etc.) the movable piece.

An example of this embodiment will be described with reference to the drawings. In this embodiment, a printer provided with a cutting device will be described as an example. However, it is understood that other apparatuses could also be provided with the cutting device described in this embodiment.

Figure 1:
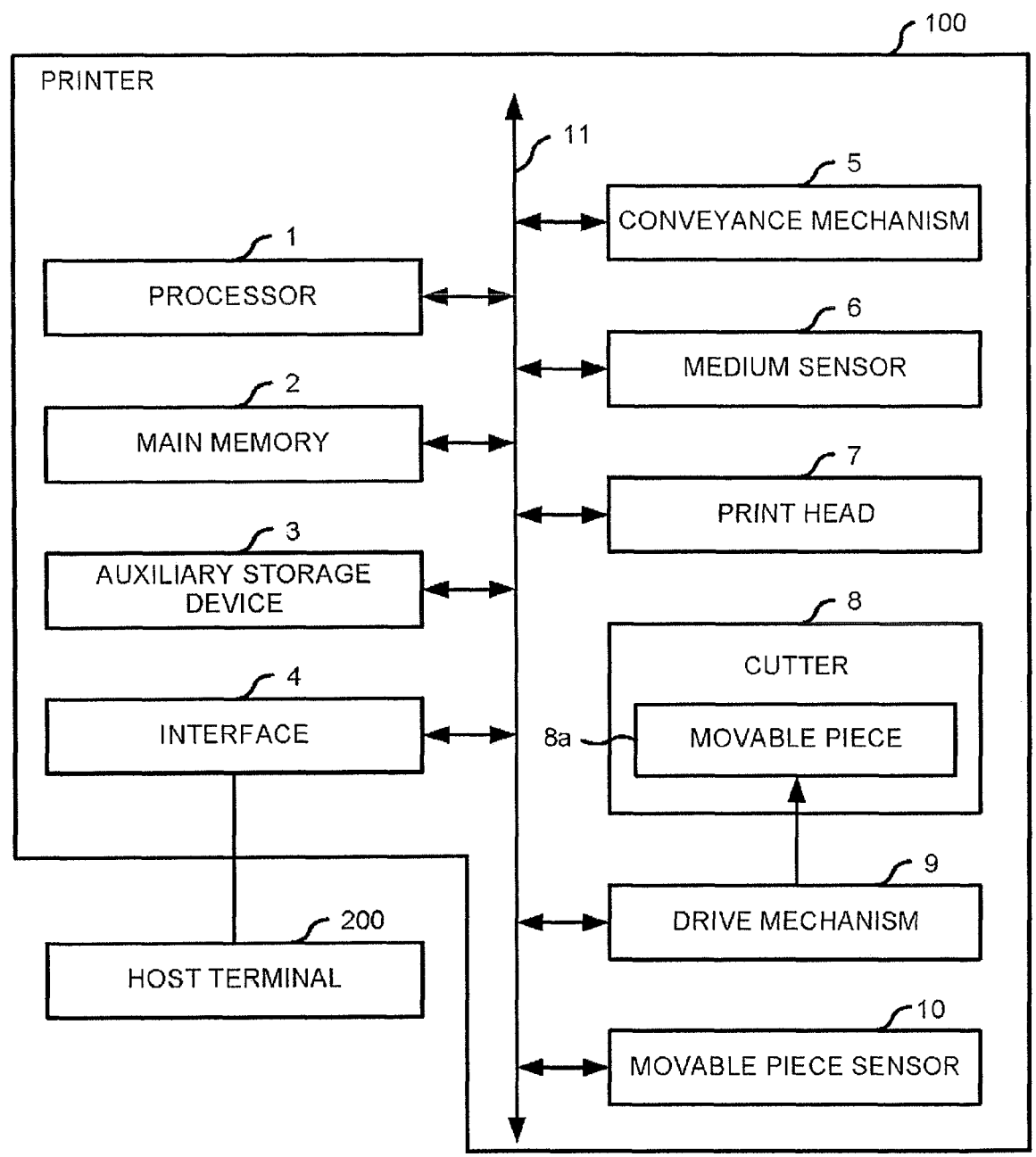
FIG. 1 is a block diagram illustrating a circuit configuration of a portion of a printer, according to an example embodiment.

FIG. 1 is a block diagram illustrating a circuit configuration of a portion of a printer 100 (e.g., of mains portions of the printer 100, etc.), according to this embodiment.

In the printer 100, an elongated print medium wound in a roll shape is used. The printer 100 generates a printed matter having a target size by performing printing on a part of an area on a front end side of the print medium. The printed matter is, for example, a receipt. The material of the print medium is typically paper but may be a material other than the paper, such as resin.

A host terminal 200 is connected to the printer 100. The host terminal 200 is a host computer or a point-of-sale ("POS") terminal. The host terminal 200 transmits print data, indicating printing contents, to the printer 100 and instructs the printer 100 to execute printing according to the print data.

The printer 100 includes a processor 1, a main memory 2, an auxiliary storage device 3, an interface 4, a conveyance mechanism 5, a medium sensor 6, a print head 7, a cutter 8, a drive mechanism 9, a movable piece sensor 10, and a transmission path 11. The processor 1 is connected to the main memory 2, the auxiliary storage device 3, the interface 4, the conveyance mechanism 5, the medium sensor 6, the print head 7, the drive mechanism 9, and the movable piece sensor 10 via the transmission path 11. The processor 1, the main memory 2, and the auxiliary storage device 3 are connected to each other via the transmission path 11 and cooperatively form a computer that performs an information process for controlling the printer 100.

The processor 1 acts as a central portion of the computer. The processor 1 executes an information process by executing an information process program (e.g., an operating system, a middleware, an application program, etc.) to control each section to realize various functions of the printer 100.

The main memory 2 acts as a main storage portion of the computer. The main memory 2 includes a non-volatile memory area and a volatile memory area. The main memory 2 stores the above-described information process program in the non-volatile memory area. The main memory 2 may store data necessary for the processor 1 to execute a process for controlling each section in a non-volatile or volatile memory area in some applications. The main memory 2 uses a volatile memory area as a work area in which data is appropriately rewritten by the processor 1.

The auxiliary storage device 3 acts as an auxiliary storage portion of the computer. The auxiliary storage device 3 may be, for example, an electric erasable programmable read-only memory ("EEPROM"), a hard disk drive ("HDD"), a solid state drive ("SSD"), or various other known storage devices. The auxiliary storage device 3 stores data used by the processor 1 to perform various kinds of processes and data generated in the process executed by the processor 1.

The auxiliary storage device 3 may store the above-described information process program in some applications.

The host terminal 200 is connected to the interface 4. The interface 4 performs a process for transmitting and receiving data to and from the host terminal 200. The interface 4 may be, for example, a device having an existing structure conforming to a known standard such as a universal serial bus ("USB"). The interface 4 may transmit and receive data by wireless communication conforming to a wireless local area network ("LAN") standard or the like.

The conveyance mechanism 5 conveys the print medium to the outside of the printer 100 through a printing position by the print head 7 and a cutting position by a movable piece 8a.

The medium sensor 6 detects the type of the print medium. In the present embodiment, the medium sensor 6 is used to detect whether the print medium is a general receipt paper or a label paper formed by attaching an adhesive label to a mount based on a difference in light reflectance of the print medium. However, a detection method by the medium sensor 6 and the number of types to be detected are not limited. For example, the medium sensor 6 may detect the type of the print medium by identifying the difference in a diameter of a core around which the print medium is wound or a mark attached to the core. If two types of papers having different thickness are used as the receipt paper in addition to a label paper, the medium sensor 6 may detect these three types. Thus, the medium sensor 6 is a type of judgment module for determining the type of the medium.

The print head 7 prints an image on the print medium corresponding to the print data transmitted from the host terminal 200. The print head 7 may be any device of a thermal transfer system, a thermal system, an impact dot system, an inkjet system, an electrophotographic system, or any other printing system.

The cutter 8 is provided with the movable piece 8a. The movable piece 8a is a blade and cuts the print medium by changing the posture or position thereof. In some examples, the movable piece 8a has a blade length longer than a width of the print medium and cuts the print medium by changing the position towards a direction intersecting a printing surface of the print medium. For example, the movable piece 8a may have a blade length longer than the width of the print medium and cut the print medium by a change in posture due to a rotation operation around one end. Alternatively, the movable piece 8a may have a blade length shorter than the width of the print medium and cut the print medium by changing position in a direction along the printing surface of the print medium. Alternatively, the movable piece 8a may have a disk shape with a blade formed on the periphery thereof and may rotate to cut the print medium by changing position in the direction along the printing surface of the print medium. The cutter 8 may be additionally provided with a member for supporting the print medium to prevent movement of the print medium in accordance with the change in the posture or position of the movable piece 8a.

The drive mechanism 9 changes the posture or position of the movable piece 8a to cut the print medium. The drive mechanism 9 returns the posture or position of the movable piece 8a to an initial state after changing the posture or position from a predetermined initial state until the cutting of the print medium is completed.

The movable piece sensor 10 detects that the movable piece 8a is in the initial state.

The transmission path 11 includes an address bus, a data bus, a control signal line, and the like, and transmits data and control signals transmitted and received among the connected sections.

Next, the operation of the printer 100 configured as described above is described.

A printing instruction output from the host terminal 200 is received by the interface 4. Then, the interface 4 notifies the processor 1 that the printing instruction is received and meanwhile stores the print data transmitted from the host terminal 200 in the main memory 2 or the auxiliary storage device 3.

When notified by the interface 4 that the printing instruction is acquired, the processor 1 performs an information process described below by executing an information process program stored in the main memory 2 or the auxiliary storage device 3.

Figure 2:
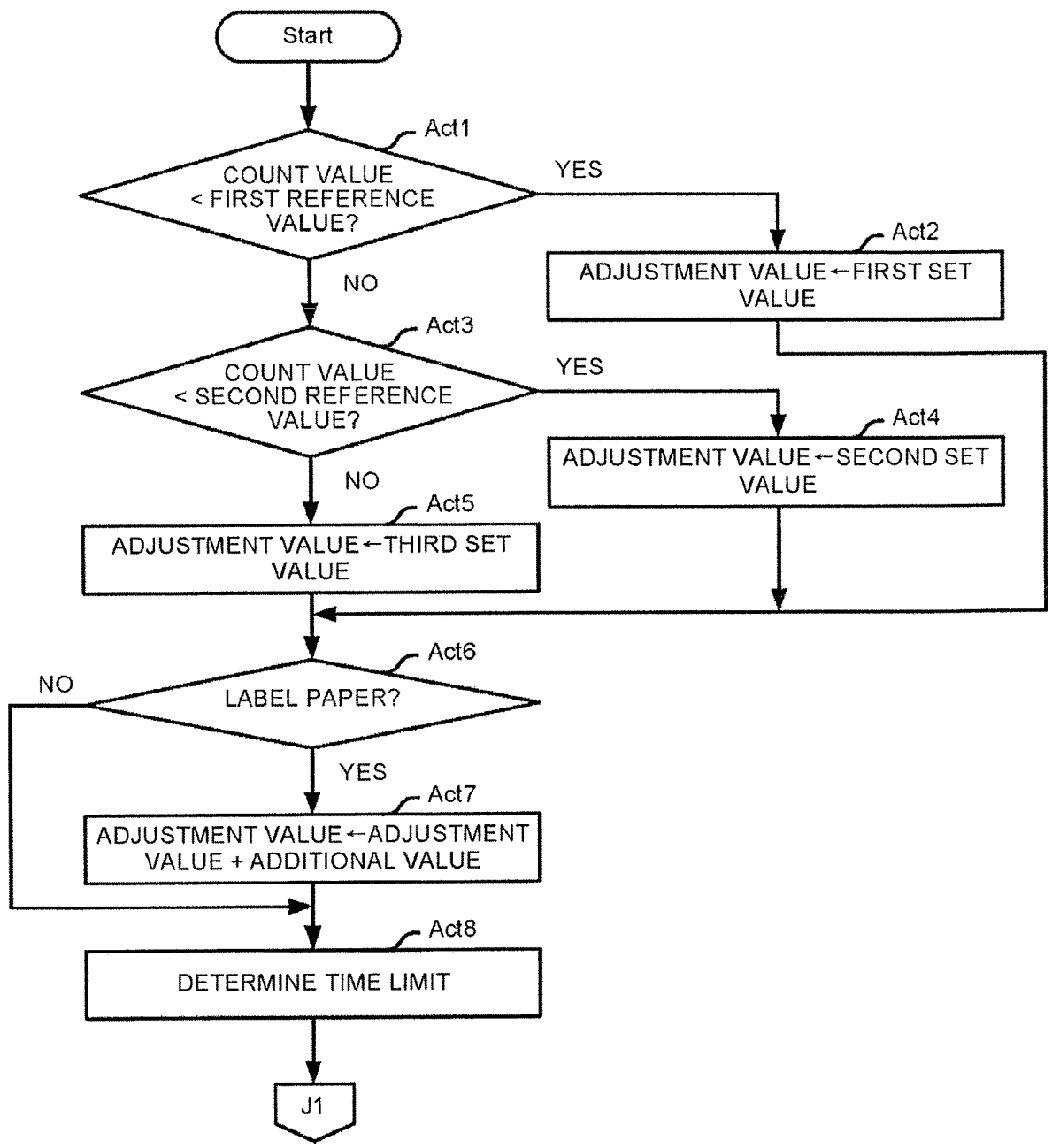
FIG. 2 is a flowchart depicting a portion of an information process performed by a processor in FIG. 1.
Figure 3:
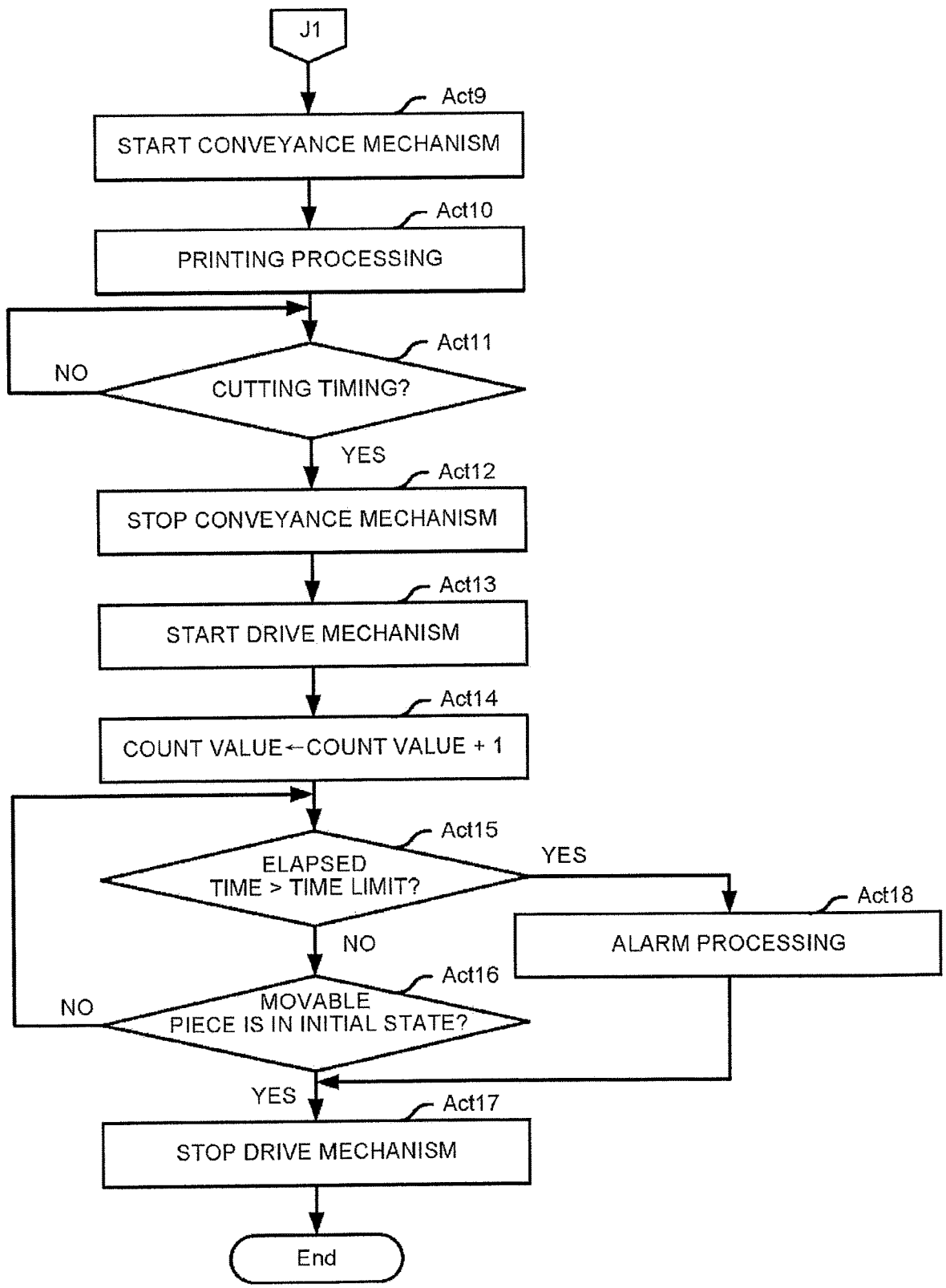
FIG. 3 is a flowchart depicting a portion of an information process performed by a processor in FIG. 1.

FIG. 2 and FIG. 3 are flowcharts depicting the information process executed by the processor 1. The contents of the processes described below are merely an example, and it is possible to appropriately change an order of a part of a process, omit a part of a process, or add another process.

In Act1 in FIG. 2, the processor 1 determines whether or not a count value of the number of times of cutting using the movable piece 8a currently attached to the printer 100 is less than a predetermined first reference value. The first reference value may be determined by, for example, a designer of the printer 100 or the like. For example, if it is assumed that the maximum number of times of cutting using the movable piece 8a is "20000", it is assumed that the first reference value is "5000". Then, if the count value is less than the first reference value, the processor 1 determines Yes, and proceeds to the process in Act2. However, in Act1, the processor 1 may determine whether or not the count value is equal to or less than a first threshold value.

In Act2, the processor 1 sets a predetermined first set value as an adjustment value for determining a time limit described below. The first set value may be determined by, for example, the designer of the printer 100 or the like. The first set value is assumed to be, for example, "5%".

If the count value is equal to or greater than the first reference value, the processor 1 determines No in Act1 and proceeds to the process in Act3.

In Act3, the processor 1 determines whether or not the count value is less than a predetermined second reference value that is larger than the first reference value. The second reference value may be determined by, for example, the designer of the printer 100 or the like. It is assumed that the second reference value is set to, for example, "10000". Then, if the count value is less than the second reference value, the processor 1 determines Yes, and proceeds to the process in Act4. However, in Act3, the processor 1 may determine whether or not the count value is less than or equal to the second reference value.

In Act4, the processor 1 sets, as an adjustment value, a predetermined second set value that is larger than the first set value. The second set value may be determined by, for example, the designer of the printer 100 or the like. The second set value is assumed to be, for example, "7%".

If the count value is equal to or greater than the second reference value, the processor 1 determines No in Act3 and proceeds to the process in Act5.

In Act5, the processor 1 sets a predetermined third set value that is larger than the second set value as the adjustment value. The third set value may be determined by, for example, the designer of the printer 100 or the like. The third set value is assumed to be, for example, "10%".

After the processor 1 sets the adjustment value in Act2, Act4 or Act5, the processor 1 proceeds to the process in Act6.

In Act6, the processor 1 determines whether or not the print medium is a label paper. Then, if the medium sensor 6 detects that the print medium is the label paper, the processor 1 determines Yes, and proceeds to the process in Act7.

In Act7, the processor 1 changes the adjustment value to a value obtained by adding a predetermined additional value to the adjustment value set in Act2, Act4 or Act5. The additional value may be determined by, for example, the designer of the printer 100 or the like. It is assumed that the additional value is, for example, "2%". The processor 1 then proceeds to the process in Act8. If the medium sensor 6 detects that the print medium is the receipt paper, then the processor 1 determines No in Act6, passes Act7, and proceeds to the process in Act8.

The processor 1 determines the time limit in Act8. Specifically, the processor 1 sets a time obtained by extending a predetermined required time according to the adjustment value as the time limit. The required time is determined by, for example, the designer as a time from when the drive of the movable piece 8a by the drive mechanism 9 is started until when the movable piece sensor 10 detects that the movable piece 8a returns to the initial state. For example, if the required time is 300 ms and the adjustment value is 5%, the processor 1 determines that the time limit is 315 ms.

The processor 1 starts the conveyance mechanism 5 in Act9 in FIG. 3. Thereby, the conveyance mechanism 5 starts to convey the print medium.

The processor 1 executes a print process in Act10. Specifically, the processor 1 drives the print head 7 to print on the print medium an image based on the print data being conveyed by the conveyance mechanism 5. In other words, in cooperation with the conveyance mechanism 5 and the print head 7, the processor 1 performs a function of a printing module. Then, if all the images based on the print data are printed, the processor 1 proceeds to the process in Act11.

In Act11, the processor 1 determines whether or not it is time to perform cutting. If a portion of the print medium required to be cut reaches a cutting position by the movable piece 8a, then the processor 1 determines Yes and proceeds to the process in Act12.

The processor 1 stops the conveyance mechanism 5 in Act12.

The processor 1 starts the drive mechanism 9 in Act13. Thereby, the drive mechanism 9 starts to change the posture or the position of the movable piece 8a to start the cutting of the print medium.

In Act14, the processor 1 updates the count value to a value obtained by adding 1 to the previous count value. In this way, the count value is increased when the change in the posture or position of the movable piece 8a occurs. Specifically, the processor 1 counts the number of times the movable piece 8a changes as the count value. Thus, the processor 1 executes the information process by executing the information process program, and in this way, the computer having the processor 1 as a central portion functions as a counting module for performing such counting.

In Act15, the processor 1 determines whether or not the elapsed time since the start of the drive mechanism 9 exceeds the time limit. If the elapsed time does not exceed the time limit, then the processor 1 determines No and proceeds to the process in Act16.

In Act16, the processor 1 determines whether or not the movable piece 8a is in the initial state. If the movable piece sensor 10 does not detect that the movable piece 8a is in the initial state, then the processor 1 determines No and returns to the process in Act15.

Thus, in Act15 and Act16, the processor 1 stands by until the elapsed time exceeds the time limit or the movable piece 8a returns to the initial state. If the movable piece 8a returns to the initial state while the elapsed time does not exceed the time limit, and the movable piece sensor 10 detects the return to the initial state, then the processor 1 determines Yes in Act16 and proceeds to the process in Act17.

The processor 1 stops the drive mechanism 9 in Act17. Then, the processor 1 terminates the information process shown in FIG. 2 and FIG. 3.

On the other hand, if the elapsed time exceeds the time limit while the movable piece 8a does not return to the initial state yet, then the processor 1 determines Yes in Act15 and proceeds to the process in Act18.

In Act18, the processor 1 performs an alarm process to warn the user that the print medium cannot be cut normally. The alarm process may be a process of enabling a display device or a ringing device (neither is shown) included in the printer 100 to execute a display or to ring, or a process of requesting the host terminal 200 to execute a display or to ring. Then, after stopping the drive mechanism 9 in Act17 as described above, the processor 1 terminates the information process shown in FIG. 2 and FIG. 3.

In Act15, the processor 1 may determine whether or not the elapsed time reaches or exceeds the time limit. Alternatively, the processor 1 may determine whether or not the time limit is shorter than the elapsed time, or whether or not the time limit is equal to or shorter than the elapsed time, and then proceeds to the process in Act16 if Yes is determined, or proceeds to the process in Act18 if No is determined. In other words, the processor 1 may proceed to the process in Act18 if the movable piece 8a does not return to the initial state before the elapsed time reaches or exceeds the time limit.

As described above, the processor 1 sets a speed of change of a position or posture of the movable piece 8a when the movable piece 8a takes time indicated by the time limit to return to the initial state as a reference speed, and it can be said that the processor 1 detects an abnormality in the cutting operation if the speed of change until the movable piece 8a actually returns to the initial state is slower than the reference speed. Thus, the processor 1 executes the information process by executing the information process program, and in this way, the computer having the processor 1 as the central portion functions as a detection module that detects an abnormality in this manner. The processor 1 determines the time limit according to the count value by executing the process in Act1 to Act8, thereby variably determining the reference speed according to the number of times the position or posture of the movable piece 8a changes. Thus, the processor 1 executes the information process by executing the information process program, and in this way, the computer having the processor 1 as the central portion functions as a determination module for making such a determination.

As described above, according to the printer 100, the abnormality in the cutting operation is detected when the movable piece 8a does not return to the initial state before the elapsed time reaches or exceeds the time limit, and the time limit is extended stepwise according to the number of times of cutting using the movable piece 8a. Therefore, when the time required for cutting is slightly extended since there is little deterioration of the blade of the movable piece 8a and deposition of attachment on the movable piece 8a, it is possible to detect the abnormality in the cutting operation with high accuracy by executing determination using the time limit, taking only a small margin into consideration. Since the margin considered in the time limit is increased as the number of times of cutting increases, even if the time required for cutting increases as the blade of the movable piece 8*a* deteriorates and a deposition amount of attachment on the movable piece 8*a* increases, it is not detected as the abnormality in the cutting operation. In this way, it becomes possible to properly detect the abnormality in the cutting operation.

According to the printer 100, an adjustment amount of the time limit is changed according to the type of the print medium. Therefore, for example, in the case of using a print medium with a large load for cutting, such as the label paper, even if the time required for cutting is extended due to the large load, it is not detected as the abnormality in the cutting operation.

According to the printer 100, the speed of change in the posture or position of the movable piece 8*a* is monitored according to a time period from when the change in the posture or position of the movable piece 8*a* is started until when the posture or position of the movable piece 8*a* returns to the initial state. For this reason, it is not necessary to use a device for measuring the actual speed of the change in the posture or position of the movable piece 8*a*, thereby simplifying the configuration thereof.

The present embodiment may be modified as follows.

A sensor for measuring the speed of change in the posture or position of the movable piece 8*a* is provided, and by comparing the speed measured by the sensor with a reference speed determined by the same process as a process of determining the time limit in the above embodiment, it is also possible to detect the abnormality in the cutting operation.

The number of times of printing may be regarded as the number of times the position or posture of the movable piece 8*a* changes.

If it is permitted to use only one type of print medium, the determination of the type of print medium is not performed, and the processor 1 may omit the process in Act6 and Act7.

The setting of the adjustment value may be performed in two stages or four or more stages. Alternatively, the adjustment value may be set to a value calculated as a value proportional to the count value by a predetermined equation.

The processor 1 may store a code indicating the type of the print medium in the main memory 2 or the auxiliary storage device 3 in response to designation of the type of print medium by an operator and perform determination in Act6 based on the code. In this case, the medium sensor 6 can be omitted.

An independent cutting device for cutting the print medium or any other medium may be used. Any device, such as a POS terminal provided with a function of the cutting device, may be also used.

A part or all the functions of the processor 1 performed by executing a control process may be performed by hardware that executes the information process that is not based on a program, such as a logic circuit or the like. Each of the above-described functions may also be performed by combining software control with the above-described hardware such as the logic circuit. For example, as the counting module, a unit for counting the number of times ON/OFF of a sensor that physically detects the movable piece 8*a* may be provided.

While certain embodiments have been described, these embodiments have been presented by way of example only, and are not intended to limit the scope of the present application. Indeed, the novel embodiments described herein may be embodied in a variety of other forms; furthermore, various omissions, substitutions and changes in the form of the embodiments described herein may be made without departing from the spirit of the present application. The accompanying claims and their equivalents are intended to cover such forms or modifications as would fall within the scope and spirit of the present application.

What is claimed is:

1. A cutting device comprising:
a cutter having a movable piece that is configured to cut a medium;
a drive mechanism configured to change a position or posture of the movable piece;
a counting module configured to count a number of times the position or posture of the movable piece changes;
a determination module configured to variably determine a reference speed according to the number of times; and
a detection module configured to detect an operation error of the cutter according to a comparison result between a speed at which the position or posture of the movable piece is changed and the reference speed.

2. The cutting device of claim 1, further comprising a judgment module configured to determine a type of the medium;
wherein the determination module is configured to vary a relationship between the number of times and the reference speed based on the type of the medium.

3. The cutting device according to claim 2, wherein:
the drive mechanism is configured to cause the movable piece to return to an initial state after cutting the medium through a change in the posture or position;
the cutting device includes a sensor that is configured to detect when the movable piece is in the initial state;
the detection module is configured to initiate a timer in response to the sensor detecting that the movable piece is not in the initial state and to clear the timer in response to the sensor detecting that the movable piece is in the initial state; and
the detection module is configured to detect the operation error in response to determining that the timer is greater than a time limit associated with the reference speed.

4. The cutting device according to claim 1, wherein:
the drive mechanism is configured to cause the movable piece to return to an initial state after cutting the medium through a change in the posture or position;
the cutting device includes a sensor that is configured to detect when the movable piece is in the initial state;
the detection module is configured to initiate a timer in response to the sensor detecting that the movable piece is not in the initial state and to clear the timer in response to the sensor detecting that the movable piece is in the initial state; and
the detection module is configured to detect the operation error in response to determining that the timer is greater than a time limit associated with the reference speed.

5. A printer comprising:
a printing module configured to print an image on a medium;
a cutter having a movable piece that is configured to cut the medium;
a drive mechanism configured to change a position or posture of the movable piece;
a counting module configured to count a number of times the position or posture of the movable piece changes;

a determination module configured to variably determine a reference speed according to the number of times; and a detection module configured to detect an operation error of the cutter according to a comparison result between a speed at which the position or posture of the movable piece is changed and the reference speed.

6. The printer of claim 5, further comprising a judgment module configured to determine a type of the medium;

wherein the determination module is configured to vary a relationship between the number of times and the reference speed based on the type of the medium.

7. The printer of claim 6, wherein:

the drive mechanism is configured to cause the movable piece to return to an initial state after cutting the medium through a change in the posture or position;

the cutter includes a sensor that is configured to detect when the movable piece is in the initial state;

the detection module is configured to initiate a timer in response to the sensor detecting that the movable piece is not in the initial state and to clear the timer in response to the sensor detecting that the movable piece is in the initial state; and the detection module is configured to detect the operation error in response to determining that the timer is greater than a time limit associated with the reference speed.

8. The printer of claim 5, wherein:

the drive mechanism is configured to cause the movable piece to return to an initial state after cutting the medium through a change in the posture or position;

the cutter includes a sensor that is configured to detect when the movable piece is in the initial state;

the detection module is configured to initiate a timer in response to the sensor detecting that the movable piece is not in the initial state and to clear the timer in response to the sensor detecting that the movable piece is in the initial state; and the detection module is configured to detect the operation error in response to determining that the timer is greater than a time limit associated with the reference speed.

9. The printer of claim 5, further comprising an interface configured to communicate with a host terminal;

wherein the interface receives print data from the host terminal; and wherein the printing module converts the print data into the image in response to the interface receiving the print data.

10. A method for detecting an operation error by a cutting device having a movable piece that is configured to cut a medium and a drive mechanism for changing a position or posture of the movable piece, the method comprising:

counting a number of times the position or posture of the movable piece changes;

variably determining a reference speed according to the number of times; and detecting an operation error of the cutting device according to a comparison result between a speed at which the position or posture of the movable piece is changed and the reference speed.

11. The method of claim 10, further comprising:

determining a type of the medium;

varying a relationship between the number of times and the reference speed based on the type of the medium.

12. The method of claim 11, further comprising:

causing the movable piece to return to an initial state after cutting the medium through a change in the posture or position;

detecting when the movable piece is in the initial state;

initiating a timer in response to determining that the movable piece is not in the initial state;

clearing the timer in response to determining that the movable piece is in the initial state;

compare the timer to a time limit associated with the reference speed; and detecting the operation error in response to determining that the timer is greater than the time limit.

13. The method of claim 10, further comprising:

causing the movable piece to return to an initial state after cutting the medium through a change in the posture or position;

detecting when the movable piece is in the initial state;

initiating a timer in response to determining that the movable piece is not in the initial state;

clearing the timer in response to determining that the movable piece is in the initial state;

compare the timer to a time limit associated with the reference speed; and detecting the operation error in response to determining that the timer is greater than the time limit.

14. The method of claim 10, further comprising:

communicating with a host terminal;

receiving print data from the host terminal;

converting the print data into an image in response to receiving the print data; and printing the image.

* * * * *